United States Patent
Zimmer et al.

(10) Patent No.: US 7,962,738 B2
(45) Date of Patent: Jun. 14, 2011

(54) HYPERVISOR RUNTIME INTEGRITY SUPPORT

(75) Inventors: Vincent J Zimmer, Federal Way, WA (US); Yasser Rasheed, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 11/961,470

(22) Filed: Dec. 20, 2007

(65) Prior Publication Data

US 2009/0164770 A1 Jun. 25, 2009

(51) Int. Cl.
*G06F 9/00* (2006.01)
*G06F 15/177* (2006.01)

(52) U.S. Cl. .......................................................... 713/2

(58) Field of Classification Search .................... 713/1, 2
See application file for complete search history.

(56) References Cited

U.S. PATENT DOCUMENTS

| | | | |
|---|---|---|---|
| 7,533,274 B2 * | 5/2009 | Freeman et al. | 713/189 |
| 2008/0148064 A1 * | 6/2008 | Challener et al. | 713/189 |
| 2008/0177974 A1 * | 7/2008 | Chiang et al. | 711/173 |
| 2008/0244553 A1 * | 10/2008 | Cromer et al. | 717/168 |
| 2008/0244569 A1 * | 10/2008 | Challener et al. | 718/1 |
| 2010/0037296 A1 * | 2/2010 | Silverstone | 726/3 |

* cited by examiner

*Primary Examiner* — Thomas Lee
*Assistant Examiner* — Mohammed H Rehman
(74) *Attorney, Agent, or Firm* — Derek J. Reynolds

(57) ABSTRACT

A method and system are disclosed. In one embodiment the method includes computing, during runtime, an active hash value of a hypervisor on a computer platform using an authenticated integrity agent. The method also includes comparing the active hash value to a registered hash reference value. The method also includes verifying the integrity of the hypervisor when the active hash value and the registered hash reference value match.

13 Claims, 3 Drawing Sheets

HYPERVISOR RUNTIME INTEGRITY SUPPORT

FIELD OF THE INVENTION

The invention relates to verifying the integrity of a hypervisor continuously during runtime.

BACKGROUND OF THE INVENTION

Virtualization solutions, such as Intel® Virtualization Technology, allow a platform to run multiple operating systems and applications as independent virtual machines. Using virtualization capabilities, one computer system can function as multiple "virtual" systems. A key component of virtualization is the hypervisor (i.e. virtual machine manager). The hypervisor runs at a lower level in the software stack than each of the one or more virtual machines running on the platform. The hypervisor launches virtual machines and then, after launch, manages the virtual machines and their respective portions of platform resources.

Information within computer platforms are commonly subjected to attacks from hackers. Both the sophistication and frequency of computer attacks on computer systems have grown steadily in recent years. While firewall software, virus scanners, encryption software and other security software offer some protection, these software solutions can only do so much to protect against other, possibly malicious, software that is running at potentially a higher privilege level. Intel® Corporation's Safer Computing Initiative has been developed to address these security risks by providing a hardware hardened framework of security in a computer platform. A key to this hardware framework is Intel® Trusted Execution Technology, which provides hardware support for the creation of parallel, protected environments that enable a much higher level of protection for code execution and confidential information in software environments.

The hypervisor is a crucial component within a virtualized computer platform. Therefore, it is important to maintain the hypervisor's integrity and not allow a hypervisor compromised by an attack manage the virtual machines on a computer platform. Currently, a hypervisor could have its integrity measured at system boot, but this would not account for a runtime attack on the system that occurred well after boot.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method and system to verify the integrity of a hypervisor continuously at runtime are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
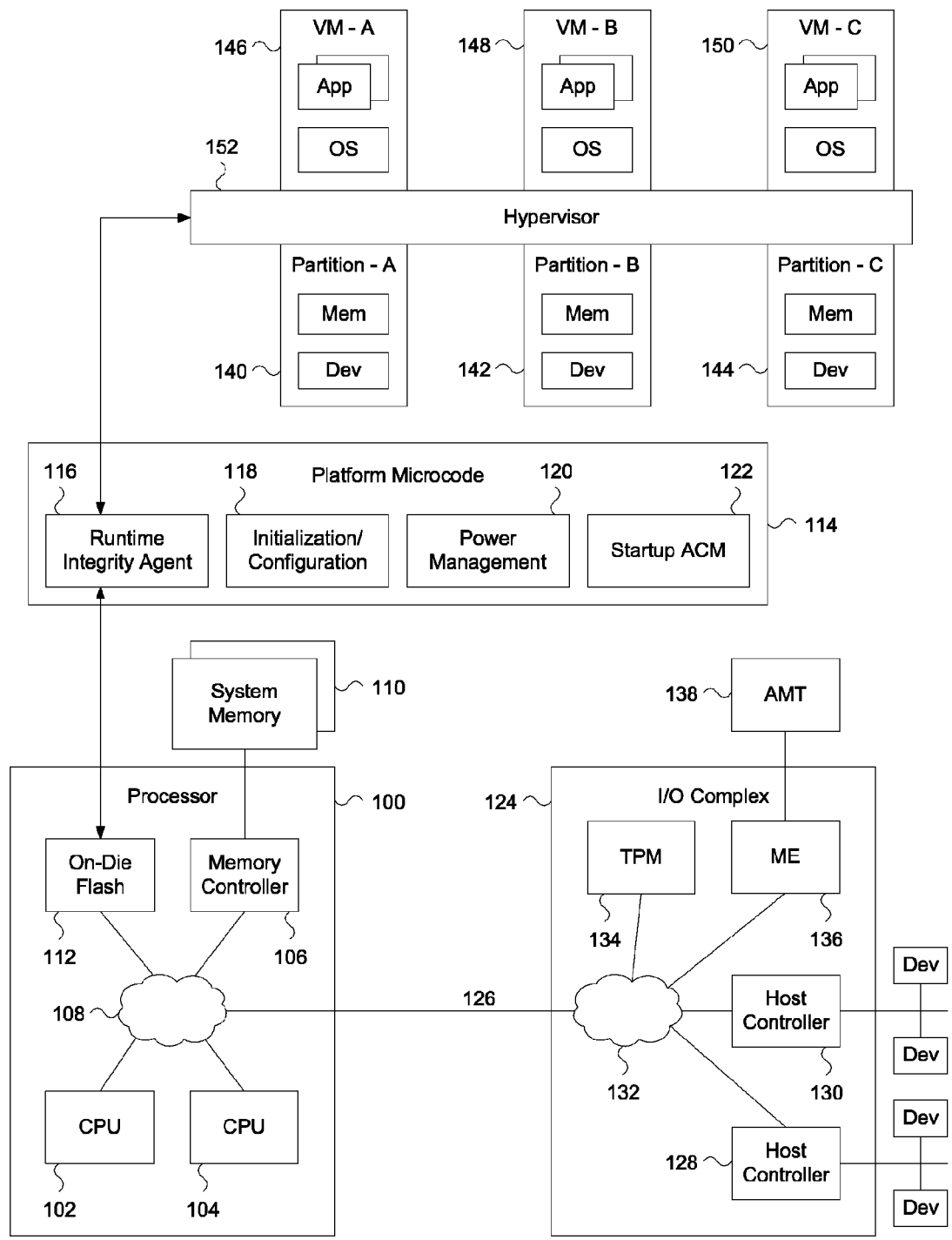
FIG. 1 describes an embodiment of a computer platform capable of continuously providing hypervisor integrity support at runtime.

FIG. 1 describes an embodiment of a computer platform capable of continuously providing hypervisor integrity support at runtime. In many embodiments, the computer platform includes one or more processors, such as processor 100. Processor 100 may include multiple cores, such as central processing units (CPUs) 102 and 104. In other embodiments, processor 100 may have a single core or may have more than two cores (these embodiments are not shown).

CPUs 102 and 104 are coupled to a memory controller 106 through a processor-internal network of interconnects (i.e. busses, links) 108. Memory controller 106 controls system memory 110. System memory 110 stores data and instructions which are operated on by CPUs 102 and 104. In many embodiments, system memory 110 is a form of dynamic random access memory (DRAM).

In many embodiments, an on-die flash device 112 stores platform microcode. Platform microcode module 114 illustrates a representative example of the microcode agents and modules that may be stored in on-die flash device 112. The platform microcode stores a number of microcode modules such as runtime integrity agent 116, initialization/configuration module 118, power management module 120, and startup authenticated code module (ACM) 122. In other embodiments, there may be one or more additional agents and/or modules in the platform microcode 114 stored within on-die flash device 112.

Processor 100 may be coupled to an I/O complex, such as I/O complex 124 with interconnect 126. I/O complex 124 may include one or more I/O host controllers, such as host controllers 128 and 130, which are coupled to interconnect 126 through an I/O complex internal network of interconnects 132. Host controllers 128 and 130 may be any one of a number of types of I/O host controllers, such as a platform component interconnect (PCI) Express® host controller, a Universal Serial Bus (USB) host controller, among others. Each host controller may manage an I/O interconnect operating using one of the listed protocols or another protocol. Additionally, there may be one or more devices coupled to each of these interconnects (such as external devices shown). There may be also one or more devices also coupled to these interconnects that are integrated devices internal to the I/O complex (devices such as these are not shown in FIG. 1).

I/O complex 124 also includes a trusted platform module (TPM) 134, in many embodiments. TPM 134 offers facilities for secure generation and usage of cryptographic keys as well as other additional security measures such as a hardware random number generator. In many embodiments, a manageability engine (ME) 136 is also included within the I/O complex 124. The ME 136 is a management processing module that provides a number of independent management functions for the computer platform when used with Active Management Technology (AMT) 138 firmware. The ME 136 using AMT 138 may be functionally able to power cycle or reset the computer platform, redirect the computer platform's boot process to cause it to boot from a network boot image, and access and change basic input/output system (BIOS) settings remotely, among other functions.

In many embodiments, the computer platform described in FIG. 1 contains virtualization technology, which allows multiple hardware partitions to be present on the computer platform. Each hardware partition, such as partitions A, B, and C (140, 142, and 144, respectively) have dedicated memory space within system memory 110 as well as potentially one or more dedicated devices, such as one or more I/O devices that may be coupled to host controllers 128 and 130. Additionally, each hardware partition may be managed by a separate virtual machine (VM) residing within system memory 110. In the example shown in FIG. 1, virtual machine A (146) manages hardware partition A (140), virtual machine B (148) manages hardware partition B (142), and virtual machine C (150) manages hardware partition C (144).

In many embodiments, a hypervisor 152, also referred to as a virtual machine manager (VMM), resides in system memory 110. The hypervisor 152 is the controlling agent for the one or more VMs in the computer platform. The hypervisor 152 runs below the VMs so the VMs are usually not aware of its presence. Each VM in the system is initially launched by the hypervisor 152. During VM launch, the hypervisor 152 allocates a portion of system memory to be dedicated to each VM. The hypervisor 152 also allocates I/O devices to one or more of the VMs.

It is vital that the integrity of the hypervisor 152 remain intact because if the hypervisor 152 is compromised, each VM (such as VM A, B, or C) that is launched from the hypervisor 152 may also be inherently compromised. Thus, in many embodiments, upon boot of the computer platform, the health (i.e. integrity) of the hypervisor 152 is verified by a trust agent in the platform. This trust agent may comprise logic that is located within the on-die flash 112, within the TPM 134, within the ME 136, within a remote agent via the AMT 138, or elsewhere on or off of the computer platform. In some embodiments, Intel® Trusted Execution Technology (TXT) on the computer platform may provide hardware rooted trust in which a chain of trust on the computer platform can be built upon from the initial boot.

In many embodiments, the on-die flash device 112 includes a unified extensible firmware interface (UEFI) platform initialization (PI) module that can invoke the runtime integrity agent 116 to measure the health of the hypervisor 152. In many embodiments, during system boot, the platform microcode 114 invokes the runtime integrity agent 116 prior to loading the hypervisor 152 into system memory 110. Furthermore, the startup ACM 122 (e.g. a basic input/output system (BIOS) ACM) in the platform microcode may include logic to authenticate the runtime integrity agent 116. The authentication process of an individual agent during system boot can be any one of a number of methods, many of which are utilized in other contexts to authenticate different agents in a trusted platform.

Thus, at system boot, platform initialization code in the microcode launches the integrity agent, the startup ACM then authenticates the integrity agent, the hypervisor is then loaded into system memory, and immediately after the hypervisor is loaded, the integrity agent then securely measures the original (i.e. initial) hypervisor image with a hash function (this is done through an attestation process). In many additional embodiments, the authentication/attestation processes are executed through the TPM 134 in the I/O complex 124. The hash function utilized to securely measure the hypervisor may be any commonly known hash algorithm such as SHA-1. The original (i.e. reference) hypervisor hash value is then securely stored in a storage location such a platform configuration register (PCR) or a non-volatile storage on the computer platform such as a flash device, in non-volatile storage within the TPM 134, or in external non-volatile storage via the ME 136).

Figure 2:
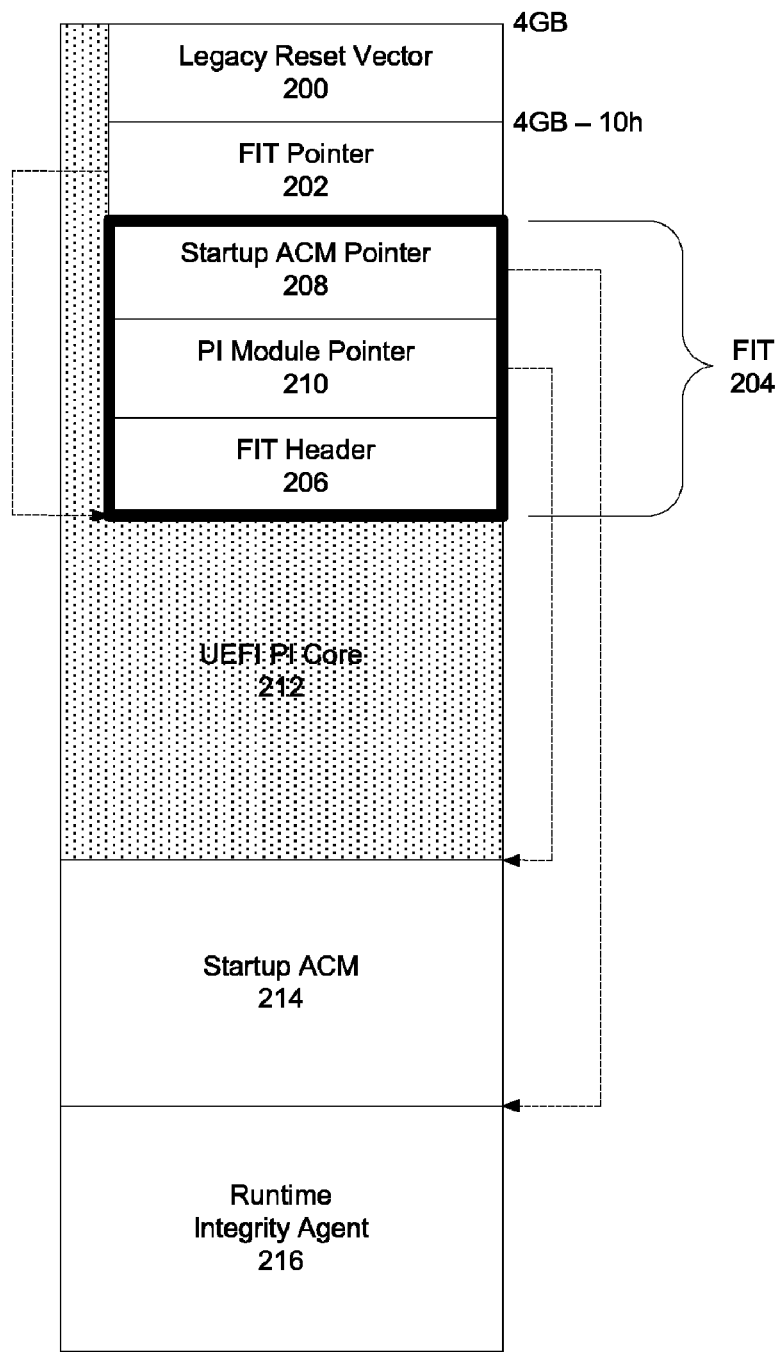
FIG. 2 describes one embodiment of the computer platform's virtual memory allocation for the on-die flash microcode that includes a runtime integrity agent.

FIG. 2 describes one embodiment of the computer platform's virtual memory allocation for the on-die flash microcode that includes a runtime integrity agent. In many embodiments, the on-die flash storage 112 (which stores the processor microcode/firmware) is given a 16 MB allocation at the top of 32-bit memory space. The very top of memory space, 4 GB (gigabyte)—10 h, contains the IA-32 (Intel® Architecture 32-bit) reset vector 200 for legacy compatibility.

In many embodiments, a firmware interface table (FIT) pointer 202 is located below the reset vector 200. The FIT pointer 202 points to the start of a firmware interface table 204 located in the processor firmware. Both the reset vector 200 and the FIT pointer 202 are located in the protected boot block in the processor firmware, which requires these locations to remain fixed.

In the embodiment shown in FIG. 2, the FIT pointer 202 points to the FIT header 206, located at the bottom of the FIT 204. The initial FIT pointer is designed such that startup microcode/hardware in the CPU can discover its location prior to accessing any other part of the flash boot ROM, including but not limited to third party macrocode at the reset vector. The FIT header 206 is an architecturally required entry in the FIT 204.

Elsewhere in the FIT 204 there may be a startup ACM pointer 208 and a platform initialization (PI) module pointer 210, among other pointers. Each pointer points to a specific location below the FIT 204. In many embodiments, the PI module pointer points to the start of the UEFI PI Core module 212. The UEFI PI Core 212 may include platform environment initialization (PEI) and driver execution environment (DXE) components, among others. The startup ACM pointer 210, in many embodiments, points to the startup ACM 214 also stored within the processor microcode. Additionally, the runtime integrity agent is shown stored in a portion of the processor microcode below the FIT 204.

Returning to FIG. 1, once the runtime integrity agent 116 measures and stores the original hash value of the hypervisor 152, the hypervisor 152 is then able to launch one of more of the VMs (such as VM A, B, and/or C). The launch of a VM may be referred to as a "secure event," which refers to an event that requires the integrity of the hypervisor 152 to not be compromised. In many embodiments, there may be events that take place in the computer platform other than a VM launch which are classified as a secure event.

For any given secure event, the runtime integrity agent 116 can remeasure the health of the hypervisor 152. To accomplish this, the runtime integrity agent 116 performs a measurement of the hypervisor 152 and receives a hash value based on the current composition of the hypervisor 152 (i.e. the hypervisor's digital signature at the time the hash value is taken). This measured runtime hypervisor hash value is then compared to the securely stored original hypervisor hash value. The runtime integrity agent can inform secure platform management logic (e.g. logic within the platform microcode, TPM, ME, among other locations) of the result. If the two hash values match, then the hypervisor 152 has not been subsequently compromised after the original measurement (i.e. during runtime) and the hypervisor 152 is allowed to proceed with the VM launch (or another secure event). On the other hand, if the two hash values do not match, then the integrity agent or other secure platform management logic can perform one or more alternate functions, such as to immediately shut down the computer.

Figure 3:
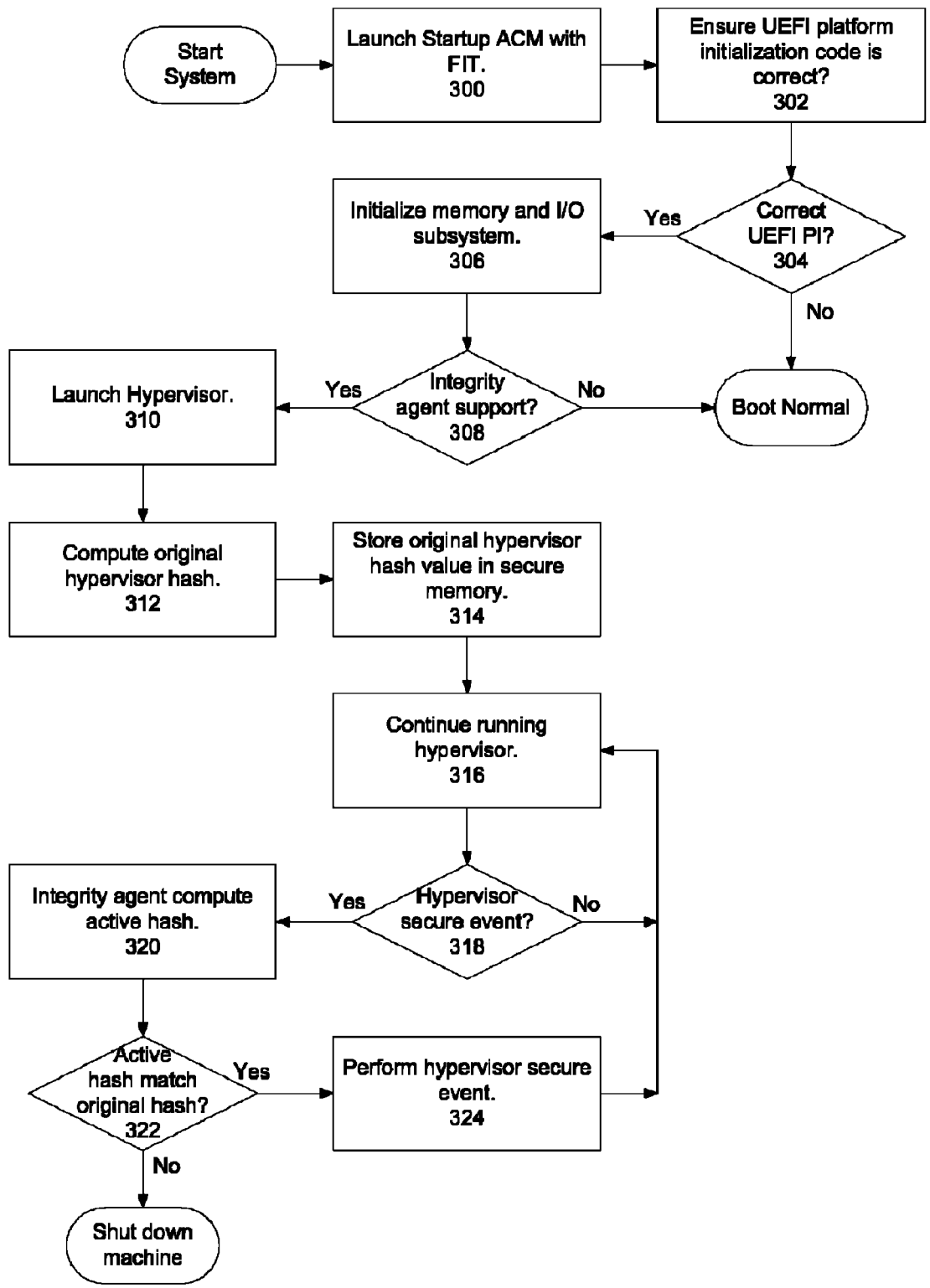
FIG. 3 is a flow diagram of an embodiment of the process to measure the integrity of a hypervisor at boot and then cross check the measurement against further runtime measurements.

FIG. 3 is a flow diagram of an embodiment of the process to measure the integrity of a hypervisor at boot and then cross check the measurement against further runtime measurements. The process may be performed by processing logic that is comprised of hardware, software, or a combination of both. Turning now to FIG. 3, the process begins when the system (i.e. computer platform) is started. Processing logic then utilizes the FIT stored in processor microcode to launch a startup ACM (processing block 300).

The process then continues with processing logic ensuring that the UEFI PI code stored within the processor microcode is correct and authentic (processing block 302). Processing logic determines if the UEFI PI code can be verified as correct (processing block 304). If the UEFI PI code cannot be verified as correct and authenticated, then the platform just boots normally. Otherwise if the UEFI PI code can be verified, then processing logic initializes the memory and I/O subsystem (processing block 306). After initialization, processing logic checks to see if there is support in the processor microcode for the integrity agent (processing block 308). If support does not exist, then the system boots normally.

If there is integrity agent support, then processing logic launches the hypervisor (processing block 310). Next, processing logic computes the original hypervisor hash value (processing block 312) and then stores the original hash value in a secure memory storage location (processing block 314). Processing logic then continues to allow the hypervisor to run (processing block 316) while continuously checking/polling for a hypervisor secure event (processing block 318).

Once a secure event is found to be taking place, processing logic causes the integrity agent to compute the active (i.e. current) hash value of the hypervisor (processing block 320). Processing logic then determines if the active hash matches the original hash (processing block 322). If the two hash values match, then processing logic performs the hypervisor secure event (processing block 324) and then returns to running the hypervisor (processing block 316). Otherwise, if the active hash and original hash values do not match, then processing logic can cause the computer platform to shut down. In other embodiments, the computer platform is caused to enter a fault recovery state or another state instead of fully powering down the entire platform.

Thus, embodiments of a method and system to verify the integrity of a hypervisor continuously at runtime are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
   computing during a given boot time, an initial hash reference value of a hypervisor using an authenticated integrity agent, wherein the initial hash reference value is recorded at the instantiation of the hypervisor;
   registering the initial hash reference value of the hypervisor in a secured location during the launch of a trust environment on the computer platform;
   computing, during runtime, runtime being a time subsequent to the given boot time and prior to a next boot time, an active hash value of the hypervisor using the authenticated integrity agent;
   wherein computing the active hash value occurs immediately prior to a secure event during runtime;
   comparing the active hash value to the registered initial hash reference value; and
   verifying the integrity of the hypervisor when the active hash value and the registered initial hash reference value match.

2. The method of claim 1, further comprising:
   launching a startup authenticated code module (ACM) during boot time of the computer platform; and
   the startup ACM authenticating the integrity agent during boot time.

3. The method of claim 1, further comprising:
   checking for support of the integrity agent during a boot time initialization of a memory and input/output subsystem in the computer platform; and
   booting the computer platform without the hypervisor run time integrity verification if there is no support for the integrity agent.

4. The method of claim 1, further comprising:
   executing the integrity agent beneath a software layer on the computer platform that includes the hypervisor so the integrity agent is not visible to the hypervisor and one or more virtual machines executing on top of the hypervisor.

5. The method of claim 1, further comprising:
   resetting the computer platform when the integrity of the hypervisor has been compromised.

6. The method of claim 1, wherein the active hash value comprises a digital signature of the composition of the hypervisor at the time the value is taken.

7. A system, comprising:
   a hypervisor to manage one or more virtual machines on a computer platform;
   a startup authenticated code module (ACM) to authenticate an integrity agent during system boot time; and
   the integrity agent to:
   compute, during a given boot time, an initial hash reference value of a hypervisor, wherein the initial hash reference value is recorded at the instantiation of the hypervisor;
   register the initial hash reference value of the hypervisor in a secured location during the launch of a trust environment on the computer platform;
   compute, during runtime, runtime being a time subsequent to the given boot time and prior to a subsequent boot time to the given boot time, an active hash value of the hypervisor;
   wherein the integrity agent further compute the active hash value immediately prior to a secure event during runtime;
   compare the active hash value to the registered initial hash reference value; and
   verify the integrity of the hypervisor when the active hash value and the registered initial hash reference value match.

8. The system of claim 7, further comprising:
   a flash memory device,
   wherein the registered initial hash reference value is stored in the flash memory device.

9. The system of claim 7, further comprising:
   a trusted platform module (TPM), the TPM including non-volatile data storage,
   wherein the registered initial hash reference value is stored in the TPM non-volatile data storage.

10. The system of claim 7, further comprising:
    a manageability engine, the manageability engine (ME) having access to secured memory storage,
    wherein the registered initial hash reference value is stored in the ME secured memory storage.

11. The system of claim 7, wherein the integrity agent is further operable to instruct a processor in the system to reset the computer platform when the integrity of the hypervisor has been compromised.

12. The system of claim 7, further comprising:
    a firmware interface table (FIT) to launch the startup ACM during system boot time.

13. The system of claim 7, further comprising:
    a processor, wherein the processor includes an integrated flash memory device, the integrated flash memory device to store the integrity agent and the FIT.

* * * * *